United States Patent [19]

Ohtsuka et al.

[11] Patent Number: 5,457,525
[45] Date of Patent: Oct. 10, 1995

[54] DISTANCE MEASURING DEVICE HAVING LIGHT RECEIVING AREAS OF DIFFERENT SIZES

[75] Inventors: Masanori Ohtsuka; Takanobu Tsunemiya, both of Kanagawa, Japan

[73] Assignee: Canon Kabushiki Kaisha, Tokyo, Japan

[21] Appl. No.: 277,135

[22] Filed: Jul. 19, 1994

Related U.S. Application Data

[63] Continuation of Ser. No. 3,439, Jan. 12, 1993, abandoned.

[30] Foreign Application Priority Data

Jan. 16, 1992 [JP] Japan ..................... 4-005639

[51] Int. Cl.$^6$ ................ G01C 3/00; G01C 5/00
[52] U.S. Cl. ............ 356/3.06; 250/201.6; 354/403
[58] Field of Search ............ 250/206.1; 356/1, 356/3.06; 354/403

[56] References Cited

U.S. PATENT DOCUMENTS

| 4,322,141 | 3/1982 | Tominaba et al. | 354/403 |
| 4,529,304 | 7/1985 | Ogawa et al. | 356/1 |
| 5,191,384 | 3/1993 | Nakanishi et al. | 356/1 |

FOREIGN PATENT DOCUMENTS 62-212512 9/1987 Japan.

Primary Examiner—Stephen C. Buczinski
Attorney, Agent, or Firm—Fitzpatrick, Cella, Harper & Scinto

[57] ABSTRACT

A distance measuring device is arranged to emit spot-shaped light toward a subject and receive light reflected from the subject by means of a light receiving sensor having a plurality of light receiving areas, thereby measuring the distance to the subject. In the distance measuring device, among the plurality of light receiving areas, a peripheral light receiving area is selected to be larger than a central light receiving area so that the accuracy of distance measurement is improved.

9 Claims, 9 Drawing Sheets

DISTANCE MEASURING DEVICE HAVING LIGHT RECEIVING AREAS OF DIFFERENT SIZES

This application is a continuation, of application Ser. No. 08/003,439 filed Jan. 12, 1993, now abandoned.

BACKGROUND OF THE INVENTION

1. Field of the Invention

The present invention relates to a light receiving sensor suitable for use in a so-called active type of distance measuring device and, more particularly, to a light receiving sensor suitable for distance measurement which has a plurality of distance measuring areas.

2. Description of the Related Art

New types of light receiving sensors have recently been known in the field of distance measuring sensors. One type of light receiving sensor is arranged to measure one area through a plurality of light receiving areas (refer to FIG. 11). Another type of light receiving sensor is arranged in such a manner that distance measurement using a plurality of light receiving areas can be performed for the purpose of distance measurement which is adapted to a wide field of view so that a plurality of areas in the field of view can be measured (refer to FIG. 12).

Referring to FIG. 11, parts L1 to L3 represent light receiving sensor elements on which light reflected from a subject located on a closest-distance side is made incident. Parts L4 to L6 represent light receiving sensor elements on which light reflected from a subject located on a far-distance side is made incident.

Referring to FIG. 12, parts L12 and L10 represent light receiving sensor elements which correspond to the left portion of the field of view, parts L7, L8 and L9 represent light receiving sensor elements which correspond to the central portion of the field of view, and parts L11 and L13 represent light receiving sensor elements which correspond to the right portion of the field of view. The left portion (as viewed in FIG. 12) of each of the light receiving sensor elements L7 to L13 serves as an area on which light reflected from a subject located on the closest-distance side is made incident as described above, while the right portion serves as an area on which light reflected from a subject located on the far-distance side is made incident as described above.

To prevent saturation of an electrical circuit due to external light incident upon a, it is customary to minimize such a light receiving sensor. Particularly in a distance measuring device which is arranged to emit light toward a subject by means of light emitting means, receive light reflected from the subject and measure the distance to the subject, it is common practice to select a sensor configuration corresponding to the size of the light emitting part of an infrared light emitting diode (IRED) which constitutes the light emitting means.

To intensify light emitted from the IRED which constitutes the light emitting means, it is customary to insert a lens in front of the IRED or to mount a hemispherical dome (refer to FIG. 9) on an IRED package.

However, the conventional light receiving sensor has a number of problems because of its size. For example, in the case shown in FIG. 11, to perform positioning of the light receiving sensor with respect to an IRED image emitted by the IRED which constitutes the light emitting means, each element is adjusted so that the IRED image can be positioned in the area of a light receiving sensor element L4 corresponding to an intermediate distance. However, the IRED image is not necessarily positioned on another light receiving sensor element in a state similar to the state where the IRED image is placed when the positioning of the light receiving sensor is effected on the basis of the intermediate distance (positioning distance), due to various factors such as a positional deviation of a distance measuring optical system, an aberration of the distance measuring optical system, the degree of accuracy of chip mounting and a positional deviation of each light receiving sensor element. In particular, a light receiving sensor element which is located closer to or at the periphery of the light receiving sensor provides a sensor output which exhibits low linearity with respect to distance. As a result, there is the problem that adjustment is difficult, complicated or impossible.

Although the arrangement shown in FIG. 12 has a plurality of IREDs for distance measurement adapted to a wide field of view, if the diameter of an IRED dome is reduced for various reasons, right and left IRED images corresponding to off-axis positions are deformed by the aberrations of light emitting and receiving lenses as shown in FIG. 10. To improve a distance measuring capability, it is desired to minimize the portion of the IRED image that is formed offset from the corresponding light receiving sensor element. However, the presence of such an aberration makes it difficult to accurately cover the IRED image, thus leading to the lowering of the distance measuring capability. In addition, similarly to the arrangement of FIG. 11, the arrangement of FIG. 12 also involves the problems due to a positional deviation of each light receiving sensor element.

SUMMARY OF THE INVENTION

It is, therefore, an object of the present invention to solve the problems of the above-described conventional examples.

To achieve this object, according to one aspect of the present invention, there is provided a light receiving sensor having a plurality of light receiving areas, which adopts an arrangement in which the light receiving size of a light receiving area located in a peripheral portion of the light receiving sensor is made larger than that of a light receiving area located in a central portion of the same.

By adopting the arrangement according to the above aspect of the present invention, it is possible to prevent degradation of linearity caused by a positional deviation due to positioning adjustment and also to prevent a remarkable lowering of distance measuring capability on the right and left sides of the light receiving sensor.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
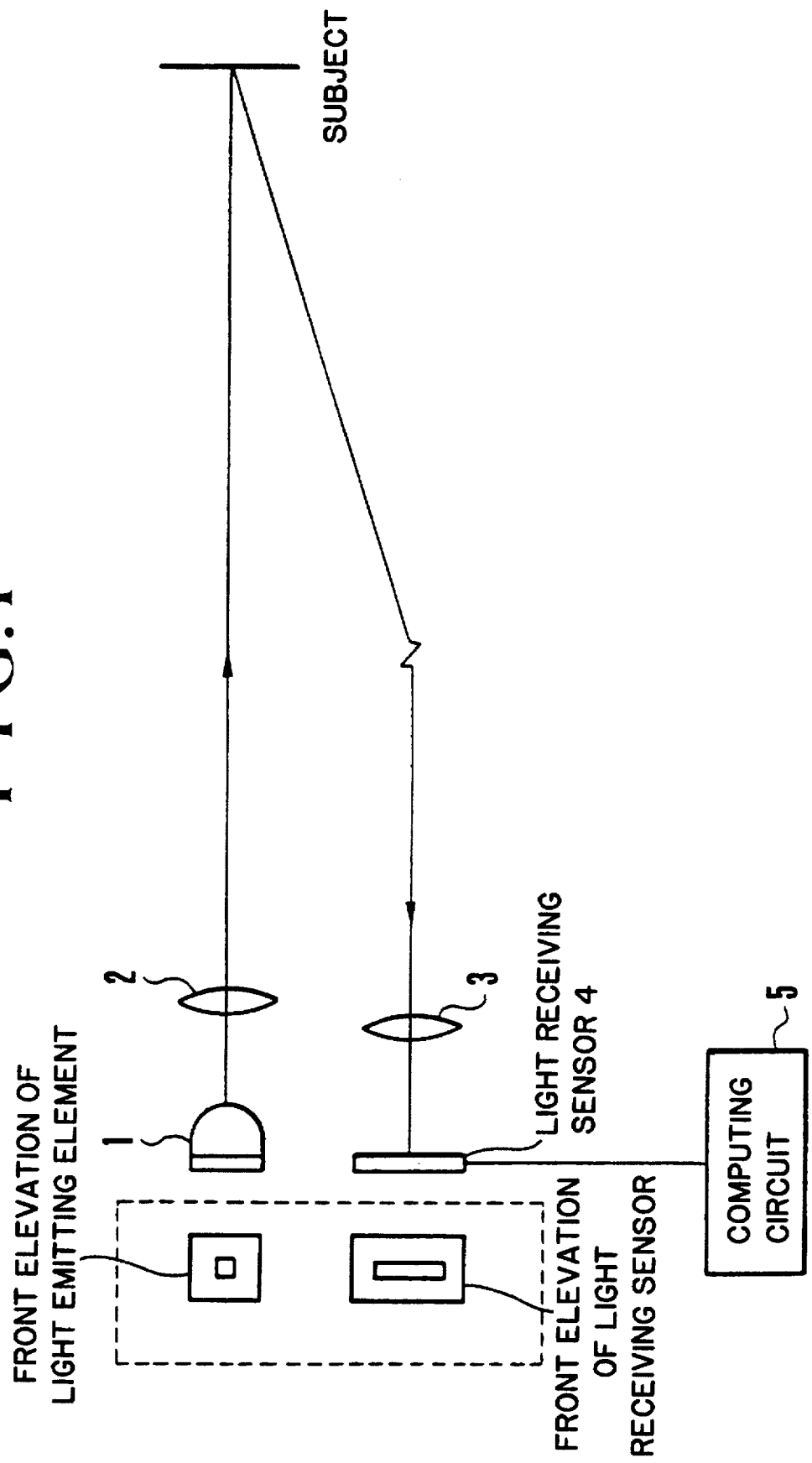
FIG. 1 is a schematic view showing a light emitting and receiving system of a distance measuring device according to the present invention.

FIG. 1 is a block diagram schematically showing a light emitting and receiving system of a distance measuring device according to the present invention.

The light emitting and receiving system depicted includes a light emitting unit 1 including a dome-shaped lens part for emitting infrared light, a light emitting lens 2, a light receiving lens 3, a light receiving sensor 4 and a computing circuit 5 for computing a subject distance from the distribution of intensity of light received by the light receiving sensor 4. The front elevational views of the light emitting unit 1 and the light receiving sensor 4 are shown in front elevation within the block shown by dashed lines in FIG. 1. The block schematically depicts the configuration of a light emitting part of the light emitting unit 1 and that of a light receiving part of the light receiving sensor 4.

Figure 2:
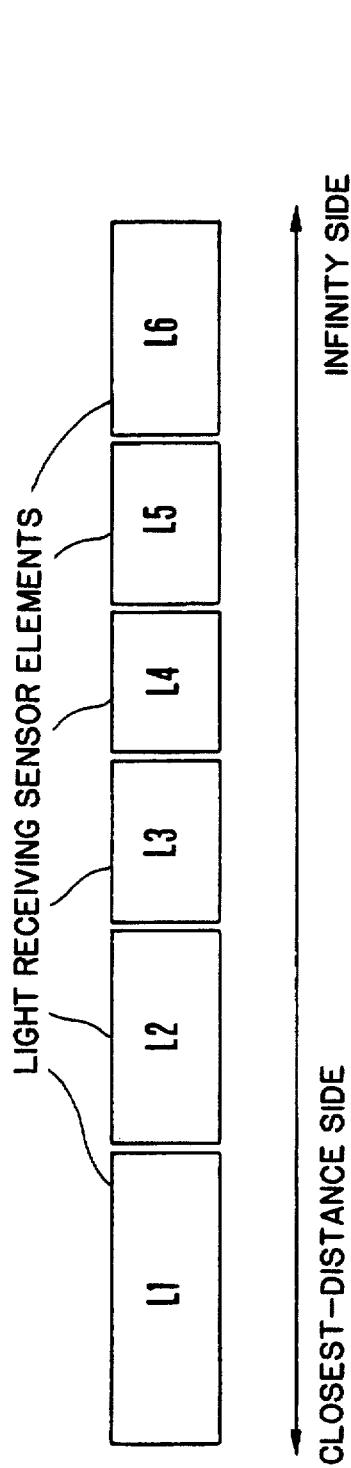
FIG. 2 is a schematic view showing a light receiving sensor for distance measurement according to a first embodiment of the present invention.
Figure 3:
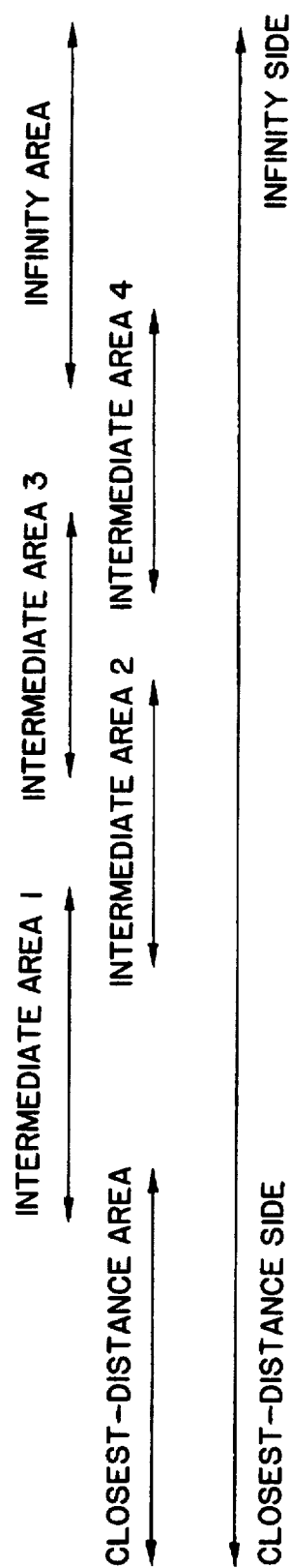
FIG. 3 is an explanatory view showing the distance measuring areas of the respective light receiving sensor elements shown in FIG. 2.

FIG. 2 is a front elevational view showing on an enlarged scale the construction of the light receiving sensor 4 for distance measurement according to a first embodiment of the present invention. FIG. 3 is an explanatory view showing distance measuring areas which are assigned to the light receiving sensor 4 shown in FIG. 2.

Light receiving sensor elements L1 to L6 are arranged as shown in FIG. 2. The light receiving sensor element L1 measures a closest-distance area, the light receiving sensor element L2 measures an intermediate area 1 which is provided near to the closest-distance side, the light receiving sensor element L3 measures an intermediate area 2 which is provided near to the closest-distance side but at a location different from that of the intermediate area 1, and the light receiving sensor element L4 measures an intermediate area 3. The light receiving lens 3 is positioned by causing the central portion of the light receiving sensor element L4 to coincide with the position of a received IRED image (not shown).

The light receiving sensor element L5 measures an intermediate area 4 nearer the infinity side and the light receiving sensor element L6 measures an infinity area.

If it is assumed that the light receiving sensor element L4 for measuring the intermediate area 3 is located in a central position, the light receiving sensor elements L1, L2 and L3 for measuring the closest-distance side relative to the light receiving sensor element L4 are arranged in such a manner that the light receiving sensor elements L3, L2 and L1 become longer in the order of L1>L2 L3 along the length of a base line. (A line extending on the light receiving sensor 4 to join the closest-distance side and an infinity side is hereinafter referred to as the "base line" and the direction in which the base line extends is called the "length of the base line".)

The light receiving sensor elements L5 and L6 are arranged in such a manner that they become longer in the order of L6>L5 along the length of the base line. The light receiving sensor element L3, L2, L1 and L5, L6 are substantially symmetrical about the light receiving sensor element L4.

Figure 11:
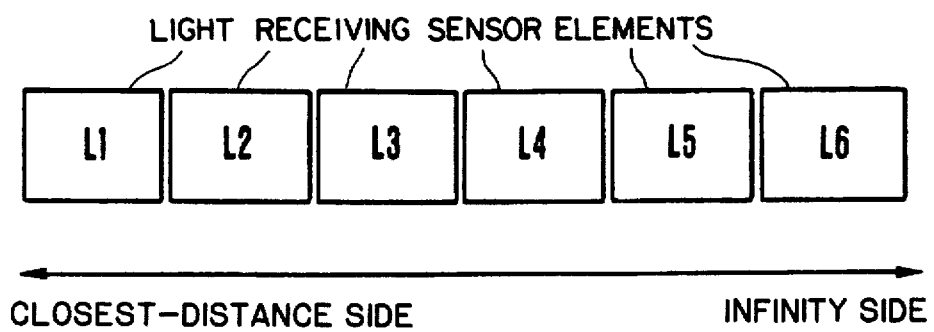
FIG. 11 is a schematic view showing a conventional light receiving sensor.

In other words, unlike the conventional example shown in FIG. 11 in which the length of each light receiving sensor element is equal along the length of the base line, the above-described first embodiment is arranged in such a manner that the light receiving sensor elements L3, L2, L1 and L5, L6, which are respectively located on opposite sides of the light receiving sensor element L4, become progressively longer in proportion to their distance from the light receiving sensor element L4 as measured along the length of the base line. Accordingly, it is possible to prevent linearity from being degraded by the distortion of an IRED image occurring on the closest-distance or infinity side. In addition, it is possible to mitigate an influence due to a deviation from accurate focus which occurs along the length of the base line.

The distribution of light intensity detected by the light receiving sensor 4 having the above-described construction is formed into a signal relative to the distance to a subject by the computing circuit 5, and a photographic lens is driven on the basis of the signal.

Figure 4:
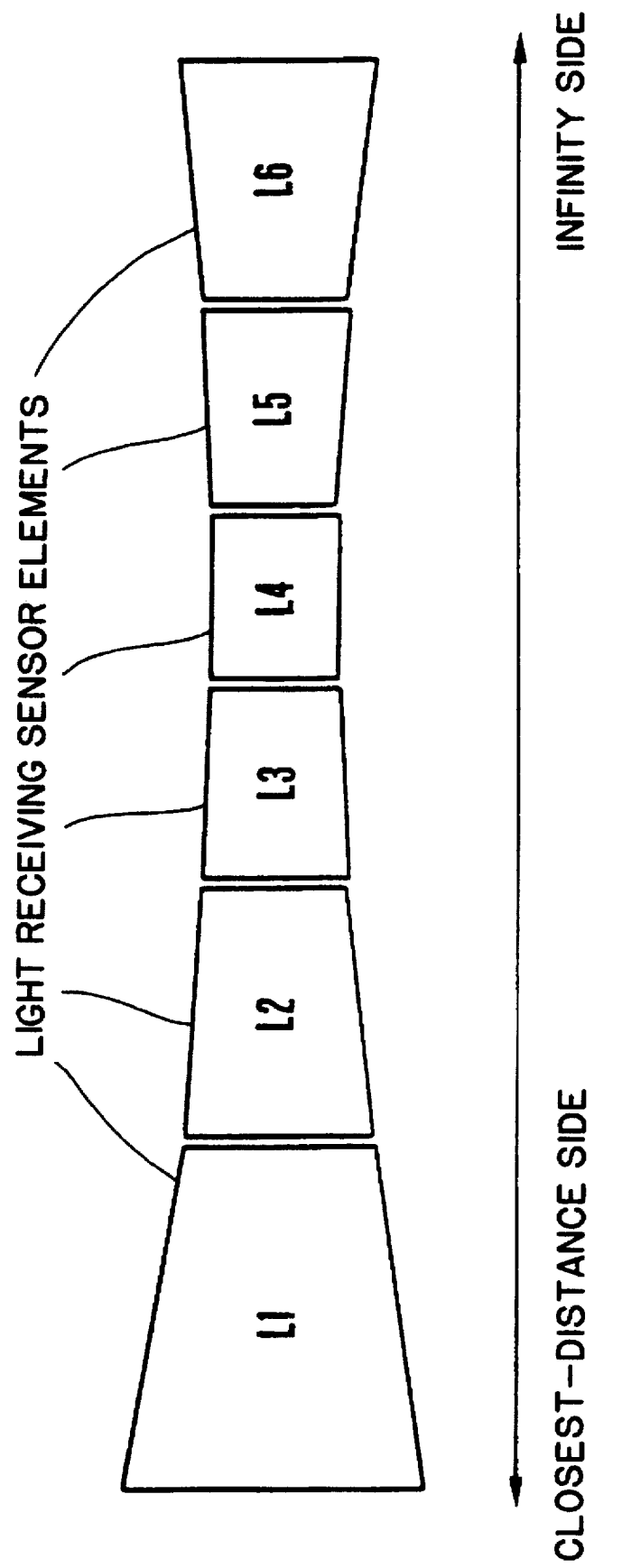
FIG. 4 is a schematic view showing a light receiving sensor for distance measurement according to a second embodiment of the present invention.

FIG. 4 is a view showing the construction of the light receiving sensor 4 for distance measurement according to a second embodiment of the present invention.

The light receiving sensor 4 for distance measurement according to the second embodiment is basically identical to that according to the first embodiment except that an improvement is added to cope with a deviation from accurate focus which occurs on the closest-distance side and on the infinity side when the light receiving lens 3 is focused on the light receiving sensor element L4.

In general, since the amount of deviation of the light receiving lens 3 from accurate focus becomes larger toward the closest-distance side, the IRED image becomes larger toward the same. Accordingly, the conventional example shown in FIG. 11 cannot cope with such a deviation with the result that linearity and distance measurement capability are degraded.

To cope with the deviation from accurate focus which occurs on the closest-distance side, the second embodiment is arranged in such a manner that the lengths of the respective light receiving sensor elements L3, L2 and L1 in the direction perpendicular to the length of the base line are also made larger according to a distance from the light receiving sensor element L4. In addition, the light receiving sensor elements L5 and L6 which constitute distance-measuring areas on the infinity side of the light receiving sensor element L4 are arranged in a similar manner.

Figure 5:
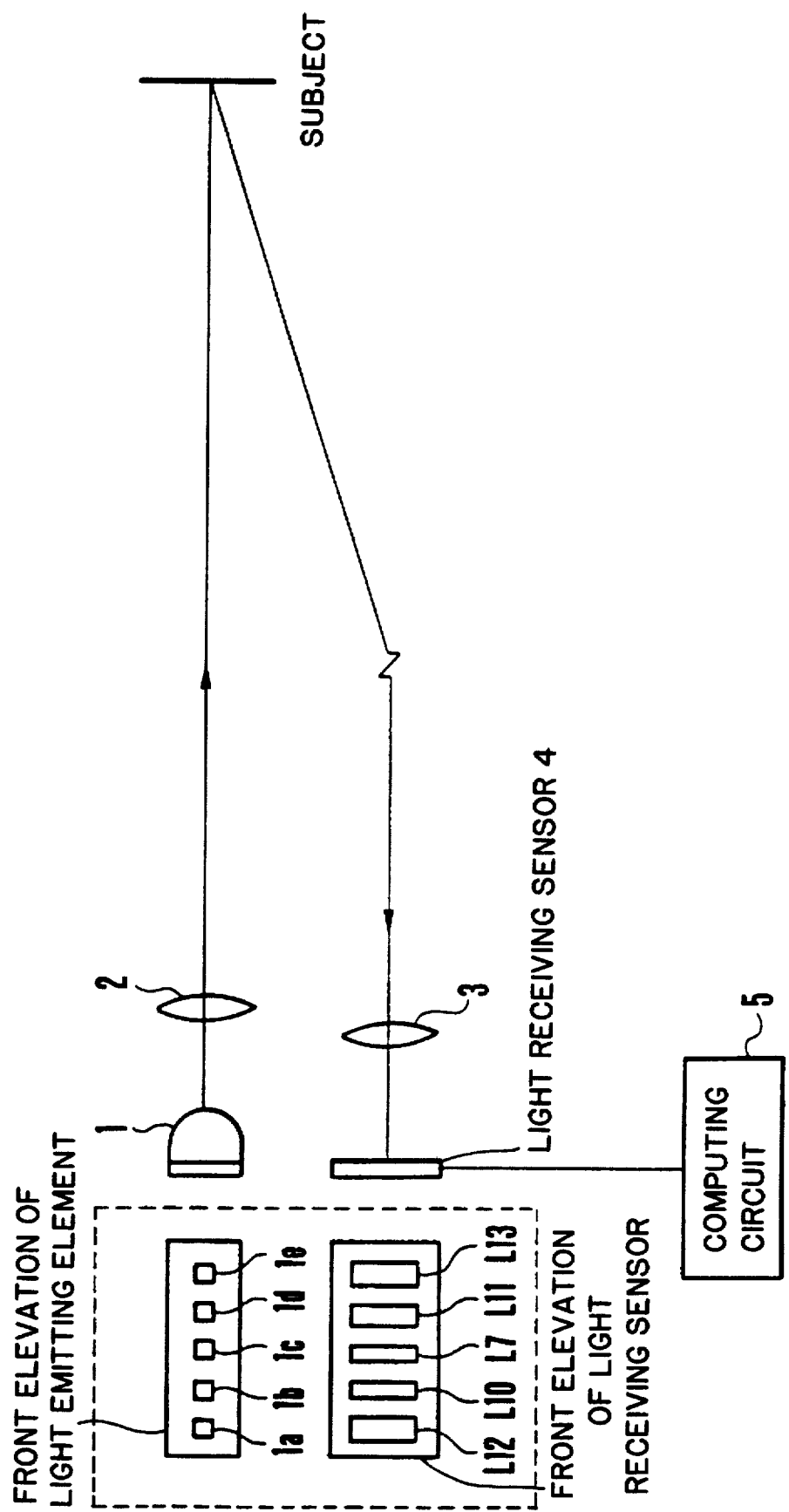
FIG. 5 is a schematic view showing a light emitting and receiving system of another distance measuring device according to the present invention.

FIG. 5 is a schematic view showing a distance measuring device according to a third embodiment of the present invention. In FIG. 5, the same reference numerals are used to denote elements having functions similar to those of the elements shown in FIG. 1.

Figure 6:
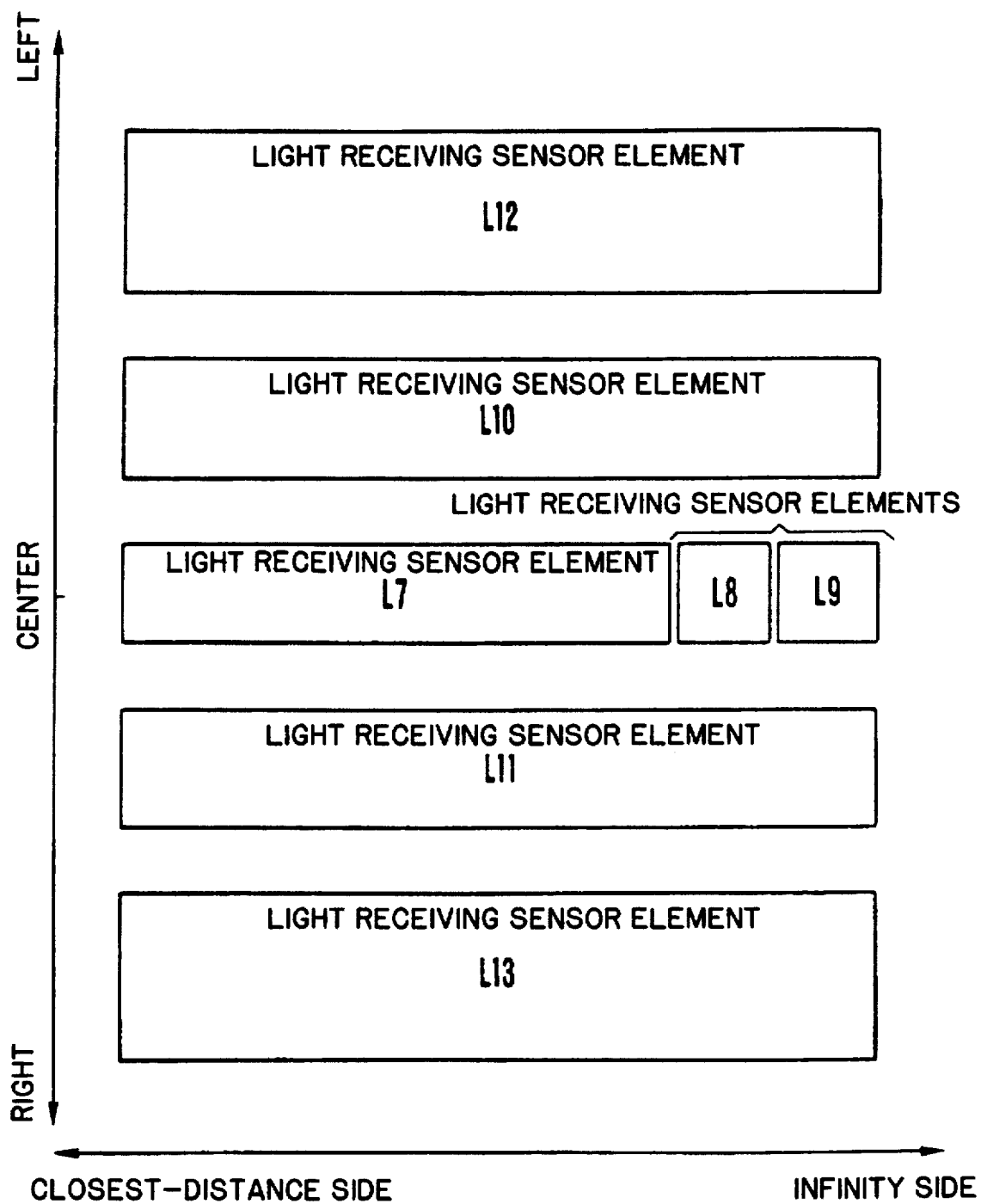
FIG. 6 is a schematic view showing a light receiving sensor for distance measurement according to a third embodiment of the present invention.

FIG. 6 is a view showing on an enlarged scale the light receiving sensor 4 for distance measurement according to the third embodiment of the present invention.

The third embodiment is made up of a light emitting unit and a light receiving sensor which are constructed to perform distance measurement adapted to a wide field of view. The respective constructions of the light emitting unit and the light receiving sensor will be described below with reference to a positional relationship to the viewfinder shown in FIG. 7.

In the third embodiment, the light emitting unit 1 includes a total of five IREDs 1a to 1e which are arranged in the following manner. The IRED 1a located on the left most side emits infrared light toward a location corresponding to an L12 area provided on the viewfinder of FIG. 7. If a subject is present in the L12 area, a corresponding IRED image is formed on the light receiving sensor element L12 shown in FIG. 6.

Figure 7:
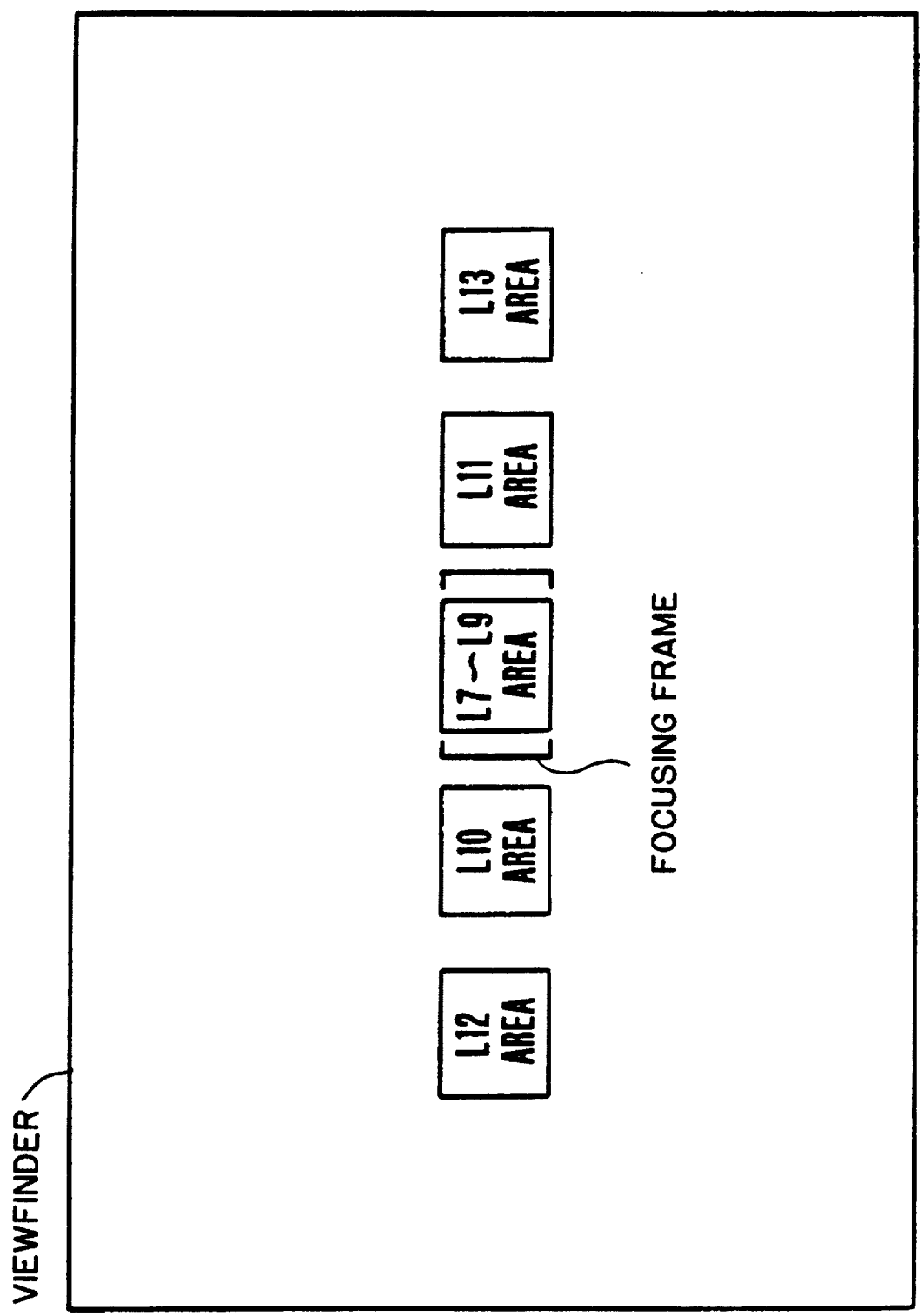
FIG. 7 is a schematic view showing a positional relation between a viewfinder and the distance measuring areas (light receiving sensor elements) shown in FIG. 6.

The second IRED 1b from the left emits infrared light toward a location corresponding to an L10 area provided on the viewfinder of FIG. 7. If the subject is present in the L10 area, a corresponding IRED image is formed on the light receiving sensor element L10 shown in FIG. 6. Similarly, an IRED image associated with the IRED 1c located in a central position is formed on the light receiving sensor elements L7, L8 and L9, an IRED image associated with the second IRED 1d from the right is formed on the light receiving sensor element L11, and an IRED image associated with the right-most IRED 1e is formed on the light receiving sensor element L13.

Figure 12:
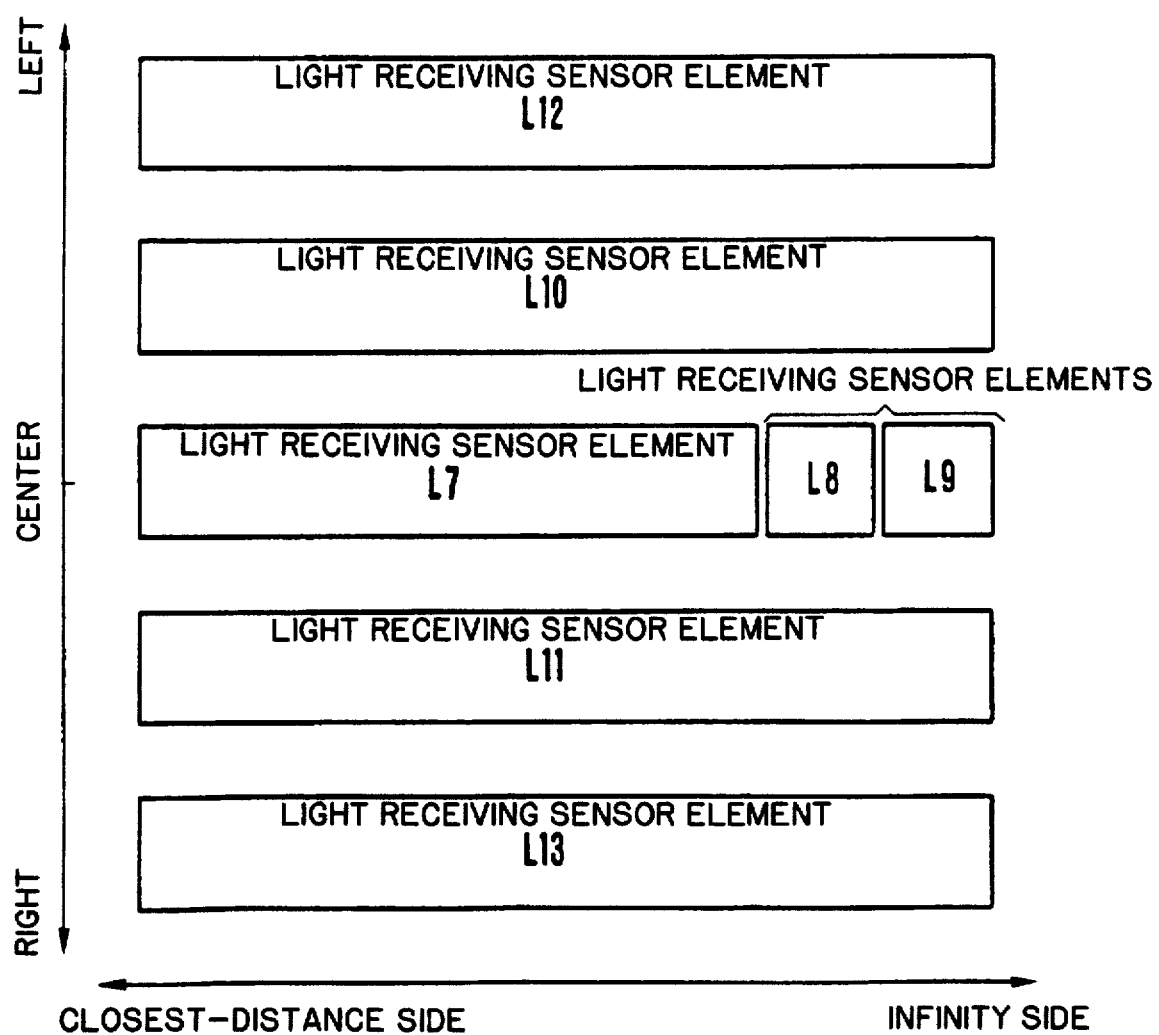
FIG. 12 is a schematic view showing a conventional light receiving sensor for distance measurement adapted to a wide field of view.

In the light receiving sensor for distance measurement adapted to a wide field of view, which has the above-described construction, the light receiving sensor 4 and the position of the IRED image are made to coincide with each other on the basis of a switching portion between the light receiving sensor elements L8 and L9, whereby the light receiving lens 3 is focused. The structure of the third embodiment differs from that of the conventional example shown in FIG. 12 in that the light receiving sensor elements L10, L12 and L11, L13, which are located on the opposite sides of the light receiving sensor elements L7, L8 and L9, become progressively wider in opposite directions perpendicular to the length of the base line as the distance from the light receiving sensor elements L7, L8 and L9 becomes larger.

Specifically, the light receiving sensor element L10 is wider than the light receiving sensor element L7, and the light receiving sensor element L12 is wider than the light receiving sensor element L10. The light receiving sensor elements L11 and L13 are arranged in a similar manner.

Figure 10:
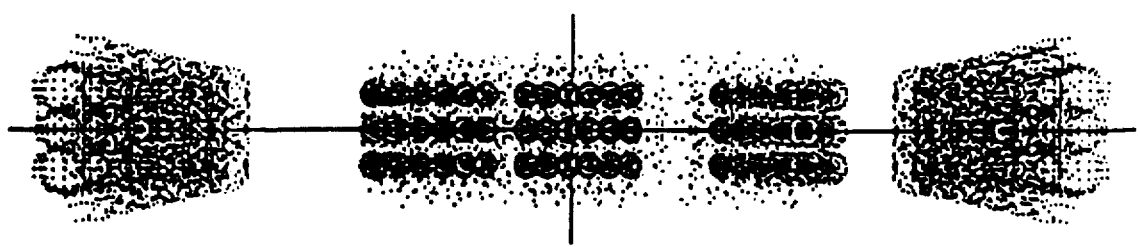
FIG. 10 is a view showing the manner of light emitted by a IRED.

As described previously in connection with the conventional example shown in FIG. 10, an IRED image is formed on a central portion of the light receiving sensor 4 at a magnification nearly equal to a design value, but an IRED image formed on a peripheral portion of the light receiving sensor 4 tends to deviate toward the periphery thereof with respect to a design value. The structure of the third embodiment is capable of covering this phenomenon and improving a distance measuring capability.

Each of the light receiving sensor elements L7 to L13 is made from a position sensitive device (PSD), and the computing circuit 5 detects a position where the highest level of light intensity appears, whereby the distance to a subject present in a corresponding area is detected. Then, focus adjustment for a photographic lens (not shown) is performed.

Figure 8:
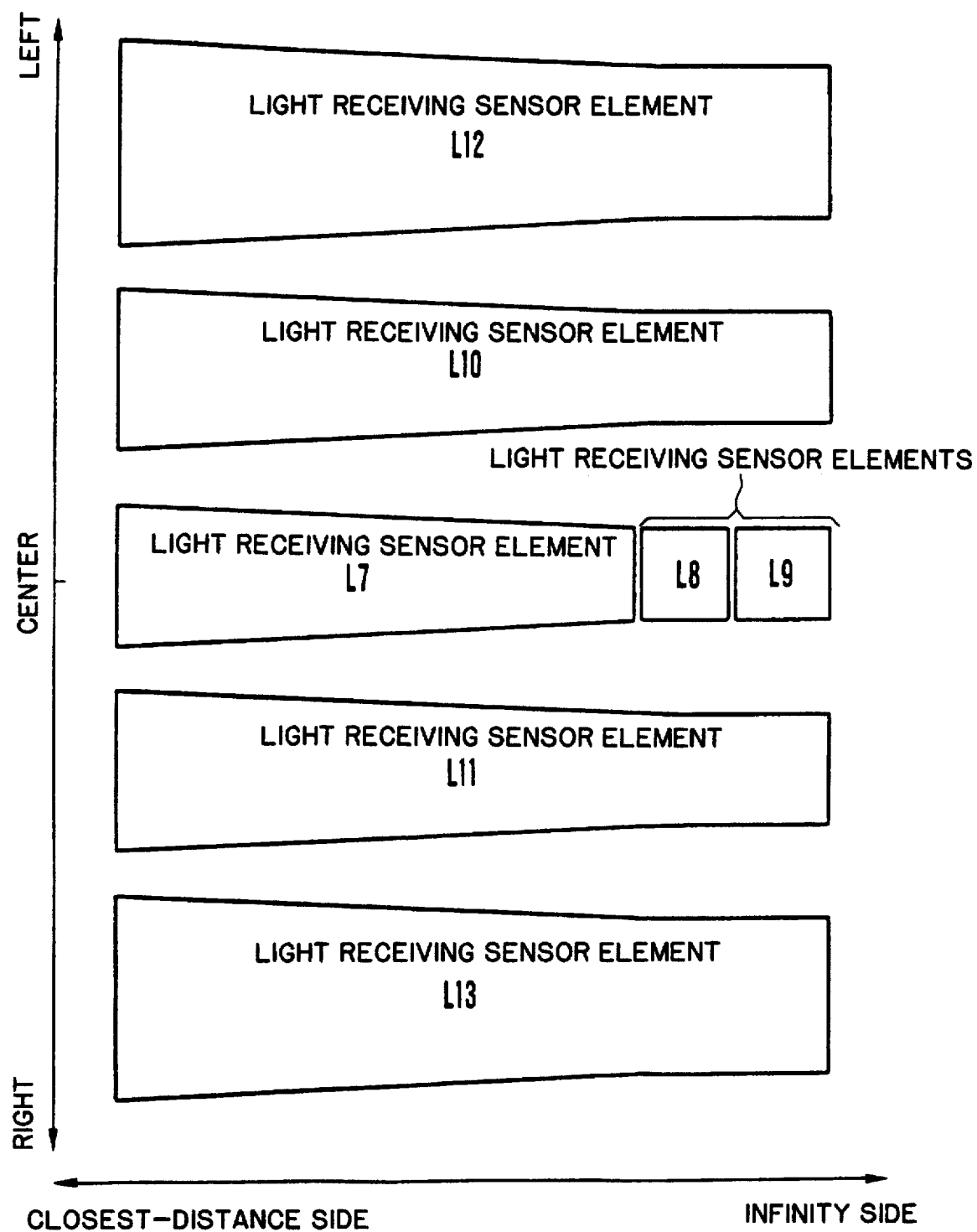
FIG. 8 is a schematic view showing a light receiving sensor for distance measurement according to a fourth embodiment of the present invention.
Figure 9:
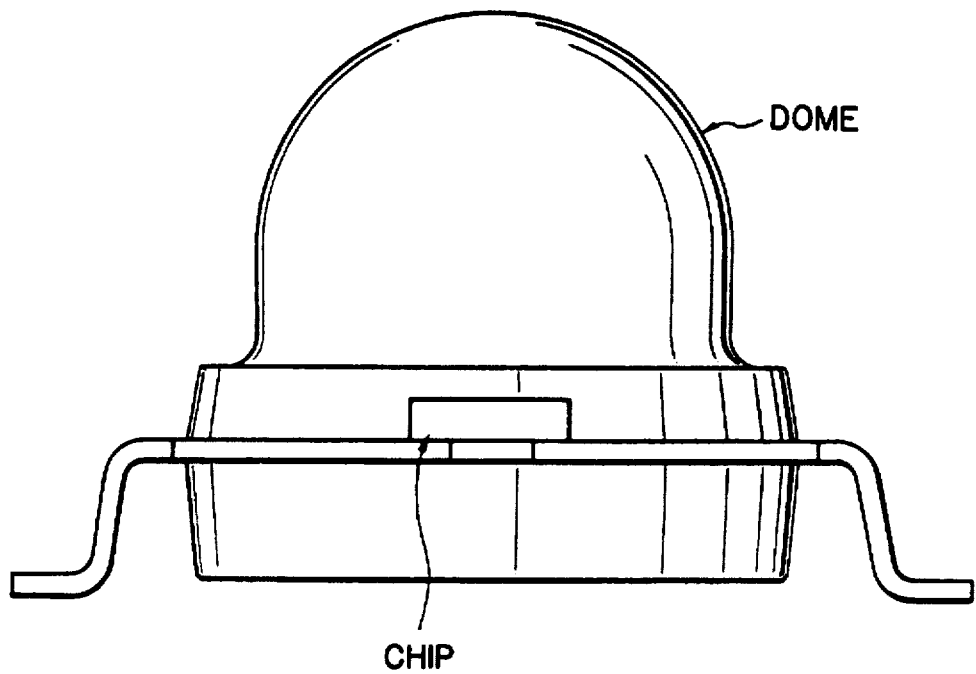
FIG. 9 is a schematic view showing one example of a package for an IRED which serves as light emitting means.

FIG. 8 is a view showing a light receiving sensor for distance measurement adapted to a wide field of view according to a fourth embodiment of the present invention.

Similarly to the embodiment shown in FIG. 6, the fourth embodiment relates to a light receiving sensor for distance measurement adapted to a wide field of view. The construction of each light receiving sensor element is basically identical to the construction shown in FIG. 6.

The fourth embodiment differs from the embodiment shown in FIG. 6 in that the width of each of the light receiving sensor elements L7, L11, L13, L10 and L12 is made progressively larger from the boundary between the light receiving sensor elements L7 and L8 toward one peripheral side.

According to each of the above-described embodiments, a light receiving sensor having a plurality of light receiving areas is arranged in such a manner that a light receiving area located in a peripheral portion is made larger than that located in a central portion. Accordingly, it is possible to prevent degradation of linearity caused by a positional deviation due to positioning adjustment, and it is possible to provide a stable light receiving sensor unit whose distance measurement capability is not remarkably lowered on either of the closest-distance or infinity sides.

What is claimed is:

1. A distance measuring device comprising:

light emitting means including a plurality of light emitting portions; and light receiving means having a plurality of light receiving areas respectively corresponding to said plurality of light emitting portions, for receiving light emitted by said light emitting means and reflected from a subject;

wherein, among the plurality of light receiving areas, a plurality of peripheral light receiving areas has larger areas than a light receiving area substantially centrally positioned with respect to the plurality of peripheral light receiving areas.

2. A distance measuring device according to claim 1, wherein the plurality of light receiving areas respectively have dimensions measured with respect to a predetermined direction and the dimension of a peripheral light receiving area in the predetermined direction is larger than the dimension of a central light receiving area in the predetermined direction.

3. A distance measuring device according to claim 1, wherein said plurality of light receiving areas are respective position sensors.

4. A distance measuring device according to claim 2, wherein the predetermined direction substantially coincides with the length-wise direction of the plurality of light receiving areas and wherein the measured dimensions are lengths of respective light receiving areas.

5. A distance measuring device according to claim 2, wherein the predetermined direction substantially coincides with the width-wise direction of the plurality of light receiving areas and wherein the measured dimensions are widths of respective light receiving areas.

6. A distance measuring device comprising:

light emitting means; and light receiving means for receiving light emitted by said light emitting means and reflected from an object, said light receiving means having a plurality of light receiving areas arranged in a predetermined direction, wherein, among the plurality of light receiving areas, a plurality of peripheral light receiving areas has greater widths, as measured in a direction other than the predetermined direction, than a light receiving area substantially centrally positioned with respect to the plurality of peripheral light receiving areas.

7. A distance measuring device according to claim 6, wherein said light emitting means comprises a plurality of light emitting parts and said light receiving means comprises a plurality of light receiving sensors respectively corresponding to said plurality of light emitting parts.

8. A distance measuring device comprising:

light emitting means comprising a plurality of light emitting parts; and light receiving means for receiving light emitted by said light emitting means and reflected from an object, said light receiving means having a plurality of light receiving sensors arranged in a predetermined direction, said plurality of light receiving sensors respectively corresponding to said plurality of light emitting parts, wherein, among the plurality of light receiving sensors, a plurality of peripheral light receiving sensors has greater lengths, is measured in the predetermined direction, than a light receiving sensor substantially centrally positioned with respect to the plurality of peripheral light receiving sensors.

9. A distance measuring device comprising:

light emitting means having a plurality of light emitting parts; and light receiving means for receiving light emitted by said light emitting means and reflected from an object, said light receiving means having a plurality of light receiving areas respectively corresponding to said plurality of light emitting parts, and said plurality of light receiving areas including a marginal light receiving area and a central light receiving area, said marginal light receiving area being larger than said central light receiving area.

* * * * *

UNITED STATES PATENT AND TRADEMARK OFFICE
CERTIFICATE OF CORRECTION

PATENT NO. : 5,457,525  
DATED : October 10, 1995  
INVENTOR(S) : Ohtsuka, et al Page 1 of 2

It is certified that error appears in the above-indentified patent and that said Letters Patent is hereby corrected as shown below:

Column 1

Line 48, "light incident upon a," should read --light,--; and  
Line 49, "light" should read --light incident upon a--.

Column 3

Line 20, "a" should rad --an--.

Column 4

Line 7, "L1>L2 L3" should read --L1 > L2 > L3--.

Column 5

Line 17, "left most" should read --left-most--.

UNITED STATES PATENT AND TRADEMARK OFFICE
CERTIFICATE OF CORRECTION

PATENT NO. : 5,457,525
DATED : October 10, 1995
INVENTOR(S) : Ohtsuka, et al

It is certified that error appears in the above-indentified patent and that said Letters Patent is hereby corrected as shown below:

Column 8

Line 3, "is" should read --as--.

Signed and Sealed this

Sixteenth Day of April, 1996

Attest:

BRUCE LEHMAN

Attesting Officer

Commissioner of Patents and Trademarks